United States Patent

[11] 3,610,899

| | | |
|---|---|---|
| [72] | Inventor | Erik B. Dahlin<br>Saratoga, Calif. |
| [21] | Appl. No. | 799,886 |
| [22] | Filed | Feb. 17, 1969 |
| [45] | Patented | Oct. 5, 1971 |
| [73] | Assignee | Measurex Corporation<br>Santa Clara, Calif. |

[54] METHOD OF OBTAINING VARIANCES OF A CHARACTERISTIC OF A SHEET MATERIAL
7 Claims, 10 Drawing Figs.

[52] U.S. Cl. .................................................. 235/151.35,
73/73
[51] Int. Cl. ...................................................... G01n 25/56
[50] Field of Search .......................................... 235/151.3,
151.35, 151; 73/73; 250/83.3 D

[56] References Cited
UNITED STATES PATENTS
2,909,660 10/1959 Alexander .................... 250/52
3,471,685 10/1969 Bishop ........................ 235/151.3

OTHER REFERENCES

Bishop "Techniques for Real-Time Determination of the Components of Variance for Control of Continuous-Sheet Process," pp. 321– 326; IEEE Transactions on Automatic Control; Oct., 1963

Primary Examiner—Malcolm A. Morrison
Assistant Examiner—Edward J. Wise
Attorney—Flehr, Hohbach, Test, Albritton & Herbert ABSTRACT: A method of maintaining the basis weight of paper produced by a machine constant by determining a true profile of the paper by use of exponential filtering, the true profile controlling slice adjustment. A total variance measurement is decomposed, by use of the true profile, into a long term machine direction variance for indicating control stability, cross direction variance for an indication of the quality of the slice adjustment and short term machine direction variance which is used for adjustment of holy roll speed in the headbox of the papermaking machine.

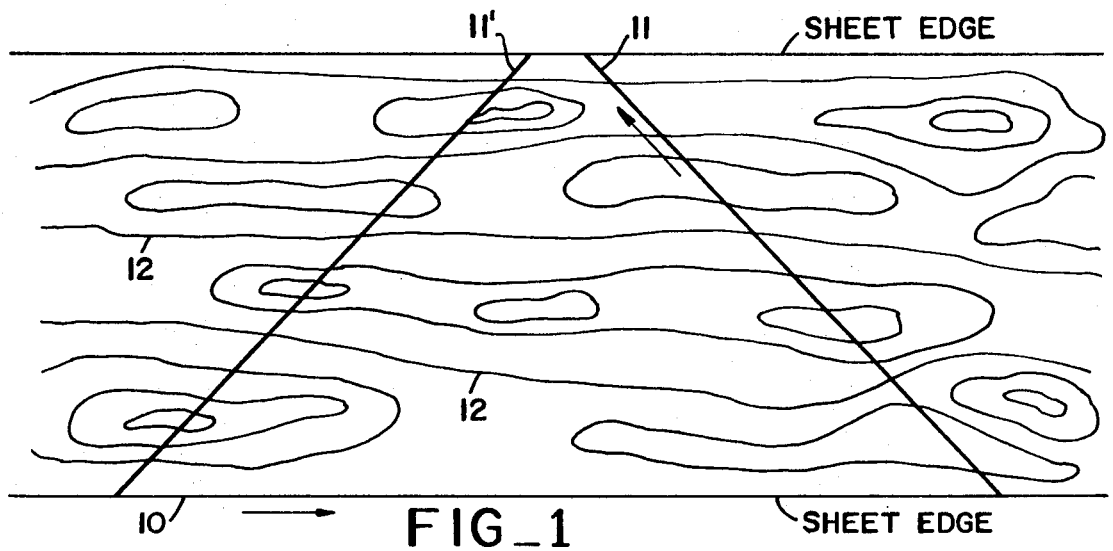
FIG_1
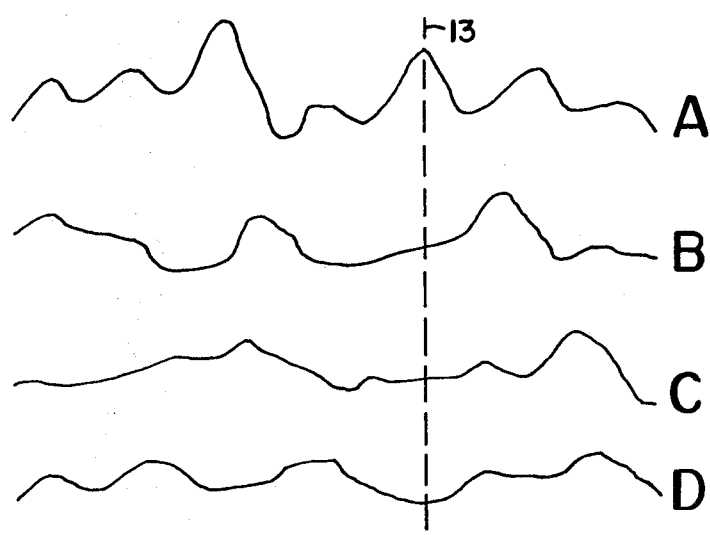
FIG_2
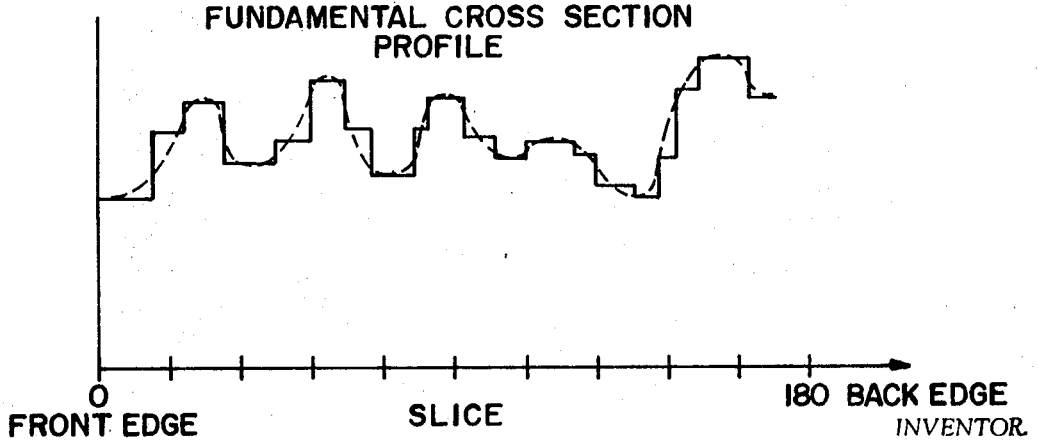
FIG_4

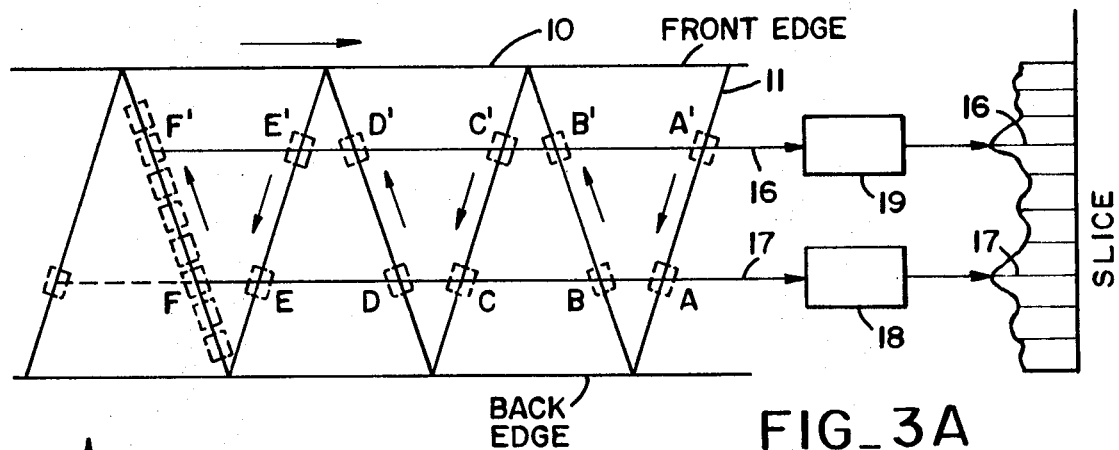
FIG_3A
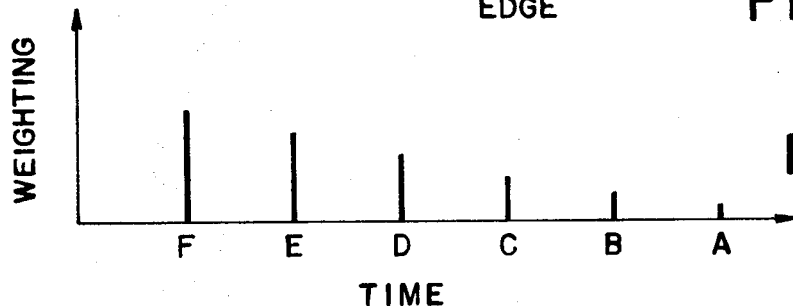
FIG_3B
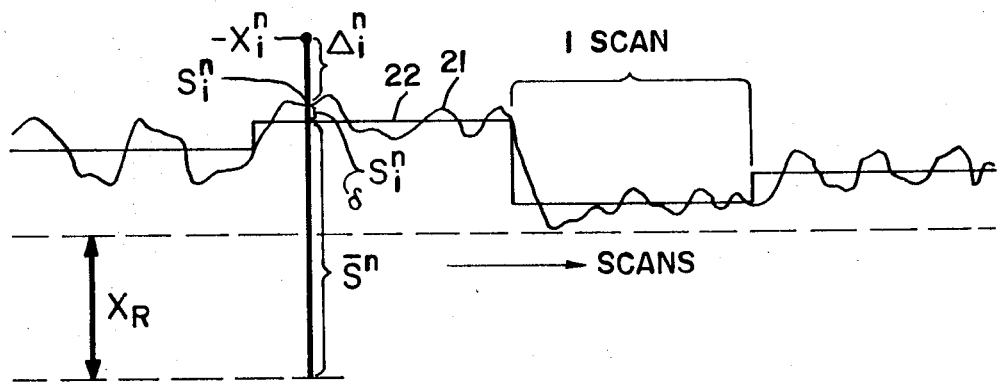
FIG_5

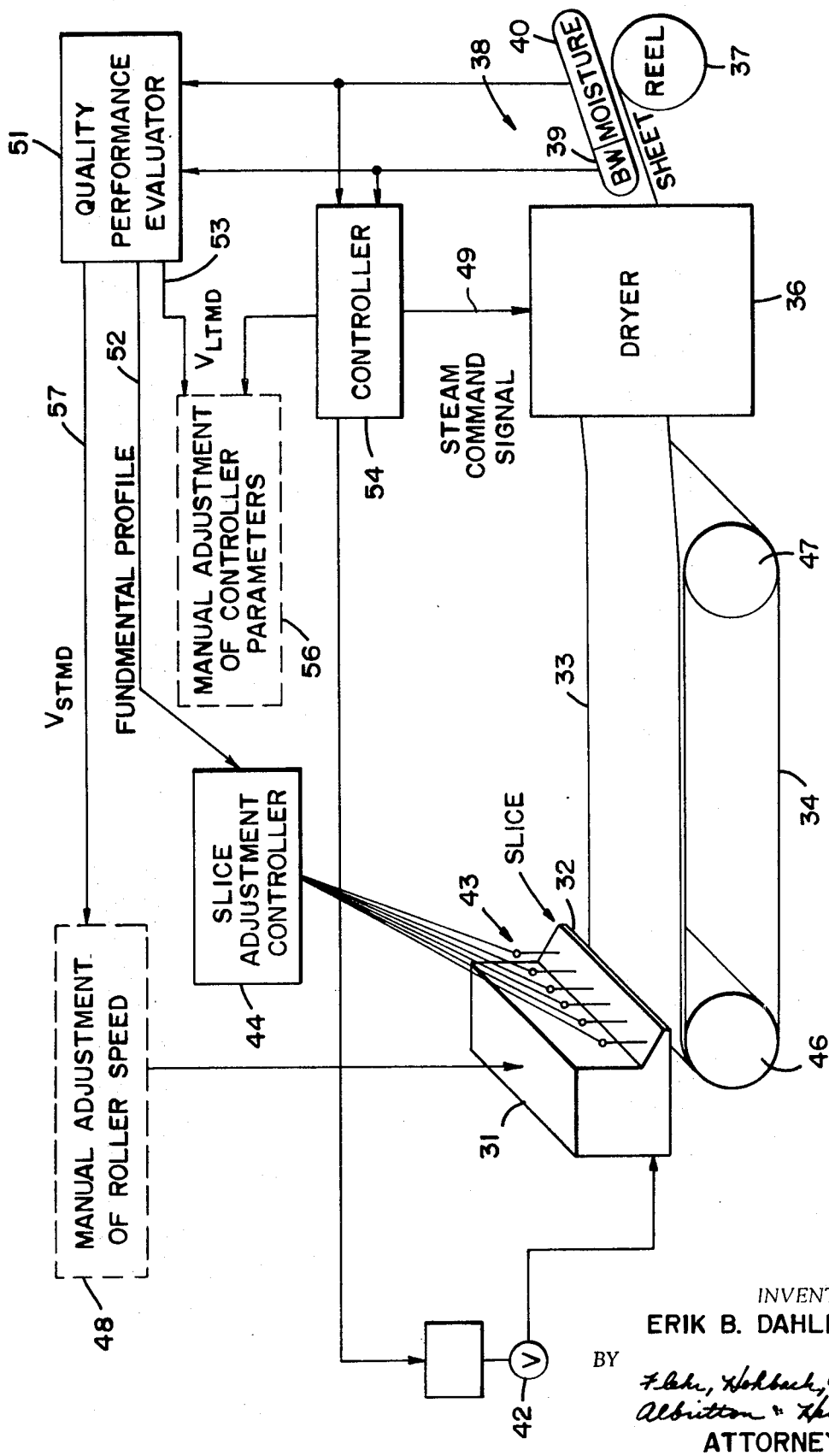
FIG_6

METHOD OF OBTAINING VARIANCES OF A CHARACTERISTIC OF A SHEET MATERIAL

BACKGROUND OF THE INVENTION

In the production of sheet material such as paper, it is desired to maintain certain properties of the sheet material constant throughout the entire material. Properties such as basis weight, weight per unit of material, will vary along the machine direction (MD) which direction is the path that the sheet material or paper is moved by the screen and rollers of the papermaking machine and will also vary in the cross machine direction (CD) which is perpendicular to the machine direction. One control parameter of a sheet material machine which is of great importance is slice adjustment.

In order to accurately control the parameters of the machine itself, it is desirable to separate the particular property such as basis weight of the material into the cross direction as opposed to machine direction and in addition, to separate a long term variance from a short term variance. Prior systems have not successfully achieved the above and moreover have not realized the importance of the above type of data separation. Moreover, prior systems have not applied this type of data separation of a property of the sheet material to the proper control parameters of the machine manufacturing the sheet material.

OBJECTS AND SUMMARY OF THE INVENTION

It is a general object of the present invention to provide an improved method for obtaining the true profile and variances of a characteristic of a sheet material being produced on a machine.

It is another object of the invention to provide a method of obtaining a true profile of sheet material being produced on a machine suitable for use in controlling the profile of the sheet material.

It is another object of the invention to provide a method as above in which the variances obtained are for the long term machine direction, the cross direction and the short term machine direction.

It is another object of the invention to provide a method as above in which the foregoing variances control or are indicative of predetermined parameters of the machine process.

In accordance with the above objects there is provided a method of obtaining long term machine direction (LTMD), cross direction (CD) and short term machine direction (STMD) variances of a predetermined characteristic of a sheet material being manufactured by a machine and applying the respective variances to predetermined control parameters of the machine to limit these variances. The method includes the steps of scanning the sheet material to obtain data for the characteristic for a plurality of points, $i$, for each of a plurality of scans, $n$, across said sheet material. This data is exponentially filtered for corresponding points lying in the same machine direction path for each scan whereby more remote data in time is given relatively less weight. A fundamental cross direction profile of the characteristic of the sheet material is constructed for each scan by combining exponentially filtered data for all of the points in such scan. The fundamental profile is then averaged. The long term average, $X_R$, of the characteristic is determined. Finally the above variances, $V$, are determined for a predetermined point, $i$, of a predetermined scan, $n$, by the case of $V_{LTMD}$ $$V_{LTMD} = \frac{N_\beta}{N_s N_\beta - 1} \sum_{n=1}^{N_s} (\bar{S}^n - X_R)^2$$

where $\bar{S}^n$ is the average of said fundamental profile, $N_\beta$ the number of points, $i$, per scan and $N_s$ the number of scans, in the case of $V_{CD}$ $$V_{CD} = \frac{1}{N_s N_\beta - 1} \sum_{n=1}^{N_s} \sum_{i=1}^{N_\beta} (S_i^n - \bar{S}^n)^2$$

where $S_i^n$ is the value of point $i$, in the fundamental profile for scan $n$, and in the case of $V_{STMD}$ $$V_{STMD} = \frac{1}{N_s N_\beta - 1} \sum_{n=1}^{N_s} \sum_{i=1}^{N_\beta} (X_i^n - S_i^n)^2$$

where $X_i^n$ is the actual value of said characteristic at point, $i$, scan, $n$. From another aspect the fundamental profile itself is used for control of slice adjustment.

BRIEF DESCRIPTION OF THE DRAWINGS

FIG. 1 is a contour map of sheet material showing variations in a characteristic of the material;

FIGS. 2A–2D illustrate curves showing typical profile measurements of the sheet of FIG. 1;

FIG. 3A is a diagram showing the data arrangement for providing a fundamental profile;

FIG. 3B is a graph useful in understanding FIG. 3A;

FIG. 4 shows a fundamental cross machine direction profile;

FIG. 5 is a curve of successive fundamental profiles useful in understanding the invention; and FIG. 6 is an overall diagram of a papermaking machine and system incorporating the present invention.

DESCRIPTION OF THE PREFERRED EMBODIMENT

While the method of the present invention is applicable to maintain constant many different characteristics of a sheet material such as moisture content, brightness, caliber and color, the preferred embodiment to be described below is specifically applicable to the control of the basis weight of a paper sheet material of a papermaking machine. A system and method for obtaining the basis weight of sheet material is disclosed and claimed in a copending patent application entitled "Basis Weight Gauging Apparatus, System and Method," filed Jan. 17, 1969, Ser. No. 791,972 in the names of Bossen et al. and assigned to the present assignee. The Bossen application describes a system in which a radiation source provides impinging radiation on the sheet material on one side of the material and transmitted radiation is detected by a radiation detector on the opposite side of the sheet material. The amount of absorbed radiation is then proportional to the basis weight of the material at that point. Both the radiation source and the detector are arranged on a carriage to continuously scan across the sheet material.

As explained in the above mentioned copending application, sheet material 10 such as paper as illustrated in FIG. 1 is moved along by a papermaking machine in the direction indicated by the arrow. Moving in the perpendicular direction across the sheet material 10 is a scanner such as is disclosed in the above-mentioned copending application which has a scanning track indicated as 11 and 11'. Information as to the sheet material's basis weight and moisture content is thereby gained by the scanner to produce profiles as shown in FIG. 2. For example, curves A, B, C and D represent four successive scans of the scanner for basis weight information. The actual variation of a characteristic such as basis weight of sheet material 10 is illustrated by the contour lines 12 where each contour line represents a magnitude of constant basis weight. Theoretically, by reconstructing the information gained from scanning the material as shown in FIG. 2 an entire contour map of a sheet material as shown in FIG. 1 could be constructed. However, this would be time consuming and would not allow the operator of the papermaking machine to make effective adjustment in a reasonable time.

As best illustrated in FIG. 2, although prior systems produce data as shown in FIG. 2 the operator of the machine would have to visually scan down the various curves, for example, along a machine direction path 13 to determine any trend in the basis weight of the material. From this trend he would then adjust whatever characteristic of the papermaking machine which would correct an undesired variance. It is apparent that this visual system has severe drawbacks as far as determining what parameter of the sheet material machine to adjust and to what degree.

FIG. 3A illustrates in greater detail the scanning of the sheet material to obtain for example basis weight in accordance with the method of the present invention. On the scan 11, the scanning head of the papermaking machine starts at the front edge of the paper sheet 10 and moves the back edge as shown. Each scan consists of a number of points, $i$, for each of a plurality of scans, $n$. Thus, a scan 11 includes the points A and A'. In practice, several data points or measurements of basis weight would be taken on each scan as illustrated by the vertical axis designated "slice." This is, of course, in the cross direction (CD) of the sheet material 10. The slice locations would, for example, on a papermaking machine be located at equidistant points across the machine. Thus, a set of points taken across a single scan 11 would yield a cross direction profile as illustrated in FIG. 2. In the preferred embodiment this profile is an indication of the variation of basis weight of the sheet material.

In accordance with the invention, however, a fundamental cross direction profile as illustrated in FIG. 4 is obtained by exponentially weighing or filtering data for corresponding points lying in the same machine direction path for each slice position; for example, the machine direction paths 16 and 17. More particularly, for each path or slice portion exponential filtering means or weighing means 18 and 19 in the case of paths 16 and 17 are provided which weigh the basis weight data in the same machine direction path in an exponential fashion as shown in FIG. 3B. Basis weight data which is more remote in time is given relatively less weight. More particularly, since sheet 10 is moving to the right, the data point A on a scan 11 would be the oldest in time and the data point F the most recent basis weight obtained from the scanning head. The most recent data would be stored in a unit such as 18 until updated by the next successive scan in accordance with the desired exponential filtering function.

The actual weighing function produced by the exponential filtering action is determined by an algorithm which is in the form of a computer program. Such algorithm is of the form $$Y_n^i = A_1 Y_{n11}^i = A_2 Y_{n12}^i = B_1 X_{n11}^i = B_2 X_{n12}^i = B_3 X_{n13}^i$$

where $Y_n^i$ is the filter output at time $nT$ where T is the time for a single scan, $X_n^i$ is the filter input at time $nT$, $i$ indicates the location of the particular machine direction path, and the constants A and B are selected for the desired degree of smoothing. For example, a single exponential filter would have constants of $A_2 = C$, $B_1 = 1 - A_1$, $B_2 = 0$, $B_3 = C$ where $C$ is a constant and $A_1$ is selected for the desired degree of smoothing. The above formula is descriptive of any third order linear filter. Additional terms may be added in an obvious manner to increase the order. The first order exponential filter as discussed above is preferred. However, many other types of smoothing filtering will accomplish the objectives of the present invention.

The present value of basis weight stored in each of the units 18 and 19 and other units associated with the remainder of the paths when combined will produce the fundamental profile curve shown in FIG. 4. The horizontal axis of the curve is "-slice38" and the vertical axis represents in this preferred embodiment basis weight. In actual practice the curve would not necessarily consist of discrete steps as shown in solid outline but could be averaged out as shown in the dashed outline. The exponential filtering action removes any rapid machine direction variations in the magnitude of the basis weight for the cross direction profile to thus eliminate random variations leaving variations which are due to some specific adjustable parameter of the paper making machine.

After the filtering action has been applied at different slice adjustment of the cross section of the sheet material 10, the fundamental profile is stored within, for example, a computer (not shown). Such storage, however, is illustrated in FIG. 4. Moreover, as will be discussed in connection with FIG. 6, the fundamental profile is directly used for slice adjustment since points on the profile correspond directly to slice adjustments.

FIG. 5 illustrates the basis weight data and its relation to the fundamental profiles for several successive scans. In accordance with the present invention in order to obtain variances as to the long term machine direction (LTMD) the variance of the short term machine direction (STMD) and variance as to the cross direction (CD) each fundamental profile 21 can be analyzed as follows. Theoretically, the total variance of a given point $X_i^n$ which is a given point $i$ on a given scan $n$ as illustrated in FIG. 5 has a variance from a long term average, $X_R$ of the basis weight of the material as determined by $$V_T = \frac{1}{N_s N_\beta - 1} \sum_{n=1}^{N_s} \sum_{i=1}^{N_\beta} (X_n^i - X_R)^2 \qquad (1)$$

However, with the use of the fundamental profile this variance can be decomposed into the long term machine direction variance, the cross direction variance and the short term machine direction variance. From a graphical standpoint, the long term machine direction variance $V_{LTMD}$ is represented by the quantity $\bar{S}^n$ which is the average of a fundamental profile for a single scan. This average is shown in the case of fundamental profile 21 by the line 22. By use of standard variance principles, the value of the long term machine direction variance may be calculated from the use of this quantity $\bar{S}^n$ by $$V_{LTMD} = \frac{N_\beta}{N_s N_\beta - 1} \sum_{n=1}^{N_s} (\bar{S}^n - X_R)^2 \qquad (2)$$

where $N_s$ is the number of scans per reel of the sheet material, $N_\beta$ is the number of readings or points taken per scan, $\bar{S}^n$ is the average of points along a given fundamental profile and $X_R$ as discussed above along term average. In practice, $X_R$ would be the desired set point or basis weight which it is desired that the papermaking machine produce.

Referring still to the curve of FIG. 5, the cross direction variance, $V_{CD}$, is, of course, represented in the case of the fundamental profile 21 by the difference between the actual basis weight $S_i^n$ which is the basis weight of a point $i$ on the fundamental profile generated after scan number $n$ as compared to the average of the fundamental profile. This is designated $\delta S_i^n$. Equation (3) represents the mathematical equivalent of this variance.

$$V_{CD} = \frac{1}{N_s N_\beta - 1} \sum_{n=1}^{N_s} \sum_{i=1}^{N_\beta} (S_i^n - \bar{S}^n)^2 \qquad (3)$$

Lastly, to obtain $V_{STMD}$, the short term variance in the machine direction, this is a function of the difference between $X_i^n$ and the actual fundamental profile $S_i^n$ as shown by $$V_{STMD} = \frac{1}{N_s N_\beta - 1} \sum_{n=1}^{N_s} \sum_{i=1}^{N_\beta} (X_i^n - S_i^n)^2 \qquad (4)$$

Thus, by the us of equations (2), (3) and (4) variance decomposition of the total variance as shown in equation (1) can be accomplished. In actual practice, this would preferably be done by computer rather than by graphical methods. Such computer procedure is not shown since it is well known and easily accomplished by one skilled in the art.

If the cross direction, short term machine direction and long term machine direction variations are uncorrected, one can calculate one of the variances from the formula $$V_{CD} + V_{STMD} + V_{LTMD} = V_T$$

Now the calculations by one of the formula (1), (3), (3), and (4) is no longer necessary. (3)

In accordance with the invention the variances thereby obtained are utilized for controlling different characteristics of a papermaking machine as illustrated in FIG. 6. The machine basically consists of a headbox 31 which through the slice opening of 32 produces a wet sheet of paper 33 moved on rotating wire 34. In accordance with normal papermaking processes the sheet 33 is processed by a dryer 36 and reeled for final shipment on reel 37. The actual diagrammatic representation of the scanning head is shown at 38 and includes a basis weight detector 39 and a moisture detector 40. In general, the papermaking machine includes adjustments such as a stock valve adjustment 42 for controlling the amount of paper slurry fed in the headbox 31, slice adjustments 43 coupled to slice adjustment controller 44, roller speed adjustment 48 of the rollers 46 and 47 which drive wire 34 and a steam command adjustment for dryer 36 indicated by the control line 49.

The quality performance evaluator 51 includes a computer processor for performing the method steps outlined above and also appropriate storage units, such as 18 and 19, for the storage of the fundamental profile. Data from scanning head detectors 39 and 40 are coupled to the quality performance evaluator 51 which then determines the fundamental profile and the variances as outlined in equations (2), (3) and (4). If the fundamental profile is uneven, the control lines from the slice adjustment controller 44 are actuated to correct such uneveness. Slice adjustment by definition can control the variation of the basis weight along the cross direction or profile of the sheet. Control line 53 designated $V_{LTMD}$ is coupled to a controller 54 through means 56 for manual adjustment of the controller parameters. The controller 54 may vary the steam coupled to dryer 36 on control line 49 and also the stock valve 42. On a control line 57 designated $V_{STMD}$ a large short term variance indicates that there is a need for adjustment of speed in the headbox or other rotating machinery in the feedlines to the headbox. This can be done either manually as shown by the dashed block 58 after signaling the operator or automatically depending on the machine being used. $V_{CD}$ may be used to check the quality of the profile adjustment.

Thus, the present invention has provided an improved method for obtaining a fundamental profile and long term, short term and cross direction variances of machines manufacturing sheet material and for correcting such variances.

I claim:

1. A method for obtaining the long term machine direction (LTMD), cross direction (CD) and short term machine direction (STMD) variances of a predetermined characteristic of a sheet material being manufactured by a machine and applying the respective variances to predetermined control parameters of the machine to limit said variances, scanning said sheet material to obtain data for said characteristic for a plurality of points, $i$, for each of a plurality of scans, $n$, across said sheet material, smoothing filtering said data for corresponding points lying in the same machine direction path for each of said scans whereby more remote data in time is given relatively less weight, constructing a fundamental cross direction profile of the characteristic of said sheet material for each scan by combining said exponentially filtered data for all of the points in such scan, averaging said fundamental profile for said scan, determining the long term average, $X_R$, of said characteristic, determining the above said variances, V, for a predetermined point, $i$, of a predetermined scan, $n$, by in the case of $V_{LTMD}$ $$V_{LTMD} = \frac{N_\beta}{N_s N_\beta - 1} \sum_{n=1}^{N_s} (\overline{S}^n - X_R)^2$$

where $\overline{S}^n$ is said average of said fundamental profile, N the number of points, $i$, per scan and $N_\beta$ the number of scans, in the case of $V_{CD}$ $$V_{CD} = \frac{1}{N_s N_\beta - 1} \sum_{n=1}^{N_s} \sum_{i=1}^{N_\beta} (S_i^n - \overline{S}^n)^2$$

where $S_i^n$ is the value of point $i$ in said fundamental profile for scan $n$, and in the case of $V_{STMD}$ $$V_{STMD} = \frac{1}{N_s N_\beta - 1} \sum_{n=1}^{N_s} \sum_{i=1}^{N_\beta} (X_i^n - S_i^n)^2$$

where $X_{in}$ is the actual value of said characteristic at point, $i$, scan, $n$.

2. A method as in claim 1 which includes the steps of controlling the slice adjustment of said machine in accordance with said fundamental profile controlling the roller speed of said machine in accordance with $V_{STMD}$ and controlling either the steam or stock valve of said machine in accordance with $V_{LTMD}$.

3. A method as in claim 1 in which said characteristic is basis weight.

4. A method for controlling a cross-direction adjustment of a machine for producing sheet material including the steps of scanning said sheet material to obtain data of a predetermined characteristic for plurality of points, $i$, for each of a plurality of scans, $n$, across said sheet material, smoothing filtering said data for corresponding points lying in the same machine direction path for each of said scans, whereby more remote data in time is given relatively less weight, constructing a fundamental cross-direction profile of the characteristic of said sheet material for each scan by combining said smoothing filtered data for all of the points, $i$, in each scan, $n$, controlling said cross-direction adjustment by use of said fundamental profile.

5. A method as in claim 4 including the steps of obtaining, by use of said fundamental profile, a long term machine direction variance, cross direction variance, and a short term machine direction variance.

6. A method as in claim 4 where said points, $i$, correspond to slice adjustment locations on said machine.

7. A method as in claim 4 where said smoothing filtering is of the exponential type.